United States Patent Office 3,317,461
Patented May 2, 1967

3,317,461
ORGANOSILICON-POLYSULFIDE RUBBERS
Edwin P. Plueddemann, Midland, Mich., assignor to Dow Corning Corporation, Midland, Mich., a corporation of Michigan
No Drawing. Filed Sept. 20, 1963, Ser. No. 310,497
12 Claims. (Cl. 260—46.5)

Polysulfide rubbers and sealants, called Thiokols, have been a commercial product since before World War II. A typical formula of one of these compounds is

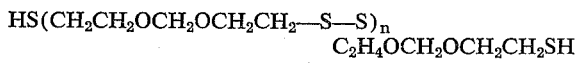
$$C_2H_4OCH_2OCH_2CH_2SH$$

Commercial polysulfides are sold where $n$ has a value of about 6, and also where $n$ is higher than 50.

These compounds are used as puncture sealants in aviation gas tanks, as building sealants, as rubber, and even as a binder for propellants of solid fuel rockets. The materials have the advantage of being relatively inexpensive. They are used by applying them to the place where they will function, whereupon they are cross-linked with themselves to form a resin or an elastomer.

One disadvantage of these materials is that, they possess an offensive odor which persists for weeks after they have been cured and are in use. Another disadvantage is that a second component must be added to the polysulfides immediately before use in order to cause the polysulfides to crosslink. Thus, they are like cement, in that one has only a limited time to apply the material to its use after it has been prepared for use, and, of course, the preparation step affords one extra chance for somebody to make a mistake and spoil the whole operation.

It is an object of this invention to produce a polysulfide resin sealant or elastomer that does not need to be mixed with a curing agent in order to crosslink, yet which is storable for a considerable length of time; i.e., a polysulfide that can be used right out of the container it comes in, at leisure, with no deadline to beat because of setting of the material.

It is also an object of this invention to produce a polysulfide sealant or rubber that does not have an offensive odor.

The composition described by this invention consists essentially of a polymer of the formula

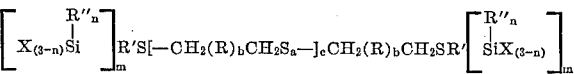

$b$ is an integer with a value of 0 to 1.

R is free of aliphatic unsaturation, and is made up of divalent radicals made up of C, H, and optionally O and S atoms, the latter being in the form of $\equiv C-O-C\equiv$, OH, —SH and $\equiv C-S-C\equiv$ groups. Thus, R can be hydrocarbon, alcohol, mercaptan, ether, or thioether divalent radicals.

$a$ is an integer with a value of 2 through 4. The exact structure of the polysulfide group represented by the symbol $S_a$— can vary. Typical structures are —S—S—, —S—S—S—S—,

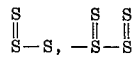
and —S—S—S—.

R' is a multivalent radical that can be composed entirely of C and H or it can contain oxygen in the form of

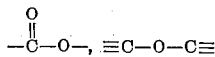

or hydroxyl groups. Thus, R' can be a hydrocarbon ester, ether, or alcohol radical, but there can be no acetylenic unsaturation therein. The number of silyl groups attached to R' varies with the valence of R'.

R" is a monovalent hydrocarbon or halohydrocarbon radical.

X is a hydrolyzable radical, the favored ones being acyloxy, alkoxy, and ketoxime

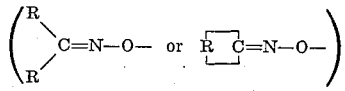

$n$ is an integer of 0 through 2 and $m$ is an integer equal to one less than the valence of R'.

$c$ is an integer of value of at least one. There is no critical value for $c$ but it is preferred that $c$ have a value of at least 5 and a particularly desirable range is when $c$ is from 5 through 100.

The term "consisting essentially of" as employed in the claims means that the polymers are substantially as shown but they can contain other groups in minor amount which do not change the basic character of the polymers. One such group is a branching group derived from a trifunctional halide as described infra. These can be incorporated into the polymers to give a branched structure which enhances the cure of the polymers.

The compositions of this invention can be made by reacting polysulfide polymers of the formula $$HS[CH_2(R)_bCH_2S_a]_cCH_2(R)_bCH_2SH$$

with a silane containing a substituent having the C=C group in the presence of peroxides or an alkaline catalyst such as alkali metal alkoxides. Peroxide catalysts are preferred for the addition of SH to non-conjugated olefins, while alkaline catalysts are most preferred for addition of SH to conjugated double bonds. The —SH group of the polysulfide adds across a double bond on a carbon substituent of the silane. The reaction is somewhat exothermic, and will go at room temperature or slightly above if a carbonyl group is conjugated with the double bond e.g.,

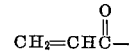

Otherwise, heating of the reaction mixture is generally required.

The reaction may be generically described by the following reaction:

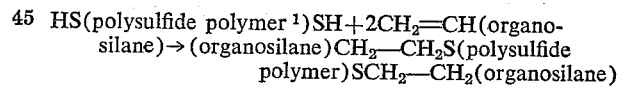

Another way of making the materials of this invention is to react the sodium salt of the polysulfide polymer, (i.e., one having SNa groups in the place of the —SH groups), with a silane that has a halogen atom on an organic substituent, for example,

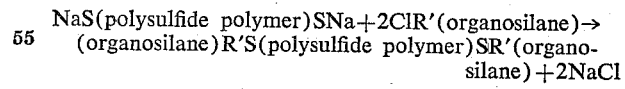

In general, heating is required for this reaction.

A third method involves reacting the polysulfide polymer having terminal SH groups with an epoxy silane. The reaction can be represented by

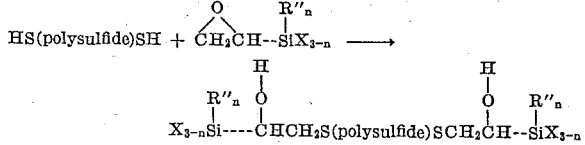

The polysulfide starting materials, both linear and branched, containing terminal —SH and —SNa groups are well-known materials, and some of them are commer- ---
[1] See column 1, line 12 for example.

cially available being sold under the name Thiokol. A general description of the preparation of such polymers is found in the High Polymer Series, vol. X, edited by Calvin E. Schildknecht and entitled, "Polymer Processes." In addition to the primary terminal groups above mentioned, the polysulfides sometimes contain some terminal —OH groups formed incidentally during the manufacture thereof. These —OH groups do not interfere with the operation of this invention and can be used to tie additional organosilane groups to the polysulfide as shown in Example 5 infra.

The substances of this invention do not have the unpleasant odor that is characteristic of the Thiokols. Instead they possess a fruity, ester-like odor.

They may be stored for a considerable period of time without curing even when mixed with siloxane curing catalysts such as isopropyl titanate or stannous octoate, as long as they are kept anhydrous. Upon contact with water, however (some varieties requiring no catalyst), the material cures to a resin or elastomer in a matter of hours. The humidity in the air is sufficient to do this to some varieties of this invention. It is often advantageous to include in the final formulation siloxane curing catalysts such as alkyl titanates, metal salts of carboxylic acids, amines, amine salts of carboxylic acids and quaternary ammonium compounds.

The curing mechanism is this: on contact with water the X groups are hydrolyzed, leaving OH groups in their place. Then OH groups on two different organosilane groups interact to split out water, leaving a siloxane bond ($\equiv$Si—O—Si$\equiv$), which is stable. Also the OH group can react with an X group to form HX and a siloxane bond. In any event the polymer chains are crosslinked, until an elastomer or a resin is formed. For effective curing, there must be an average of at least two silicon atoms and three X groups per polymer molecule.

Various additives, called "pigments" as a generic term in the rubber industry, can be added to these polymers. These "pigments" may or may not be for coloring purposes; the term also includes structural fillers and extender fillers. The pigments that can be used are the same as are used in rubber and other elastomer manufacturing, and are well-known to the art such as, for example, carbon black, silica, TiO$_2$, ZnO, lithopone, clay, etc.

The following are examples of what the variables used in describing this invention can be: R can be any divalent radical, free of aliphatic unsaturation, that is essentially hydrocarbon, alcohol, mercaptan, ether, or thioether such as

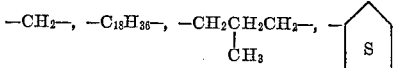

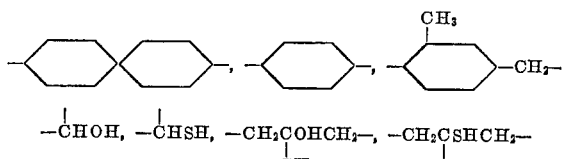

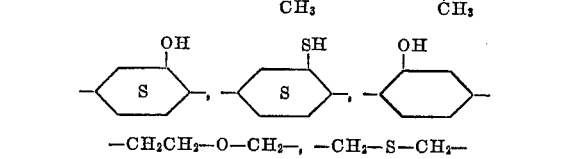

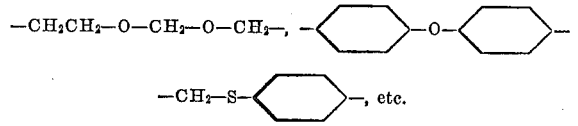

R' can be any multivalent radical that is hydrocarbon, ester, ether, or alcohol, all without acetylenic unsaturation such as

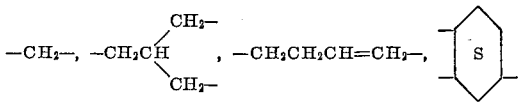

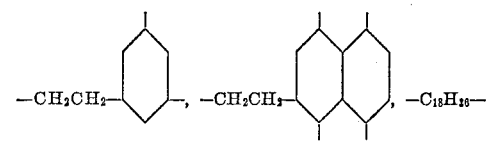

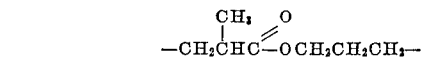

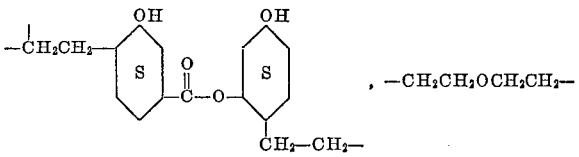

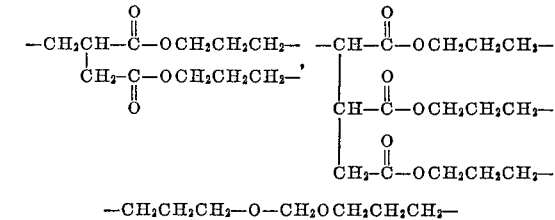

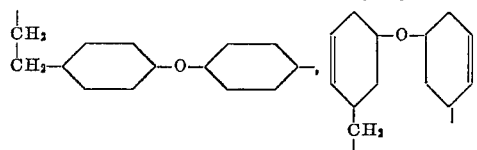

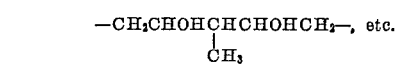

R'' can be any monovalent hydrocarbon or halohydrocarbon radical such as

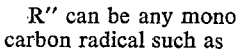 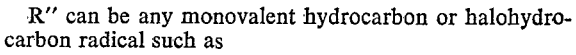

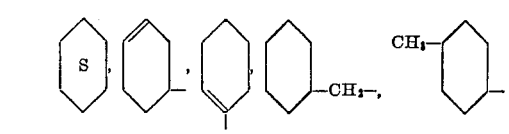

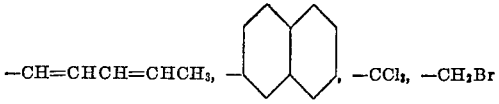

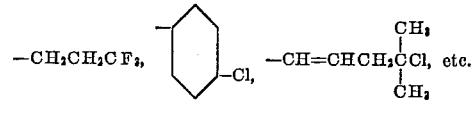

X can be any hydrolyzable group such as halogen atoms, inorganic radicals such as thiol, cyanide, thiocyanate, isocyanate, sulfate, and bisulfate. It can be radicals containing nitrogen such as amino, hydroxylamine, secondary or tertiary amino. It can be a radical containing phosphorous through phosphate radicals. It can also be an organic radical where the radical may be attached to the silicon atom through a linking oxygen, sulfur, or nitrogen atom. These radicals can be in the following forms:

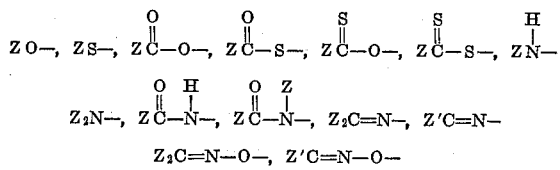

where Z is a monovalent hydrocarbon, hydrocarbon ether, or thioether radical, or a hydroxylated and/or halogenated derivative thereof, and Z' is a divalent radical of the same description as Z.

Z can be, for example, alkyl such as methyl, ethyl, propyl, butyl, and octadecyl; alkenyl such as vinyl, allyl or methallyl; cycloalkyl such as cyclopentyl, cyclohexyl or cyclohexenyl; aryl such as phenyl, xenyl and naphthyl; alkaryl such as tolyl and xylyl; aralkyl such as benzyl and 2-phenylpropyl; hydrocarbon ether such as ethoxyethyl, butoxypropyl, phenoxybutyl and tolyloxyphenyl; a halogenated derivative such as trifluoroethyl, dibromocyclopentyl, chlorophenyl, trichlorotolyl, dichlorobenzyl, trifluoroethoxyethyl, and chlorophenoxyphenyl; and hydroxylated derivatives such as hydroxyethyl, hydroxyphenyl, hydroxycyclobutyl, hydroxyethoxyethyl and hydroxyphenoxypropyl.

Z' can be

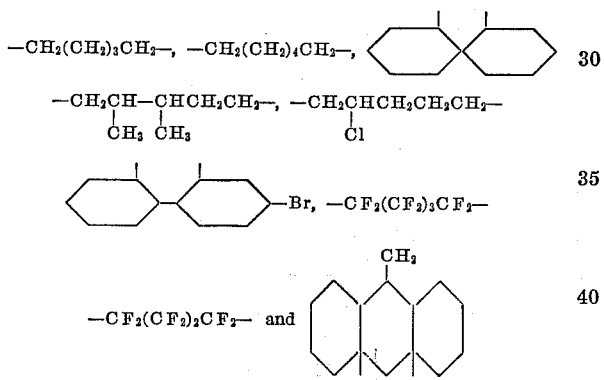

The following examples are illustrative only and should not be construed as limiting the invention which is properly delineated in the appended claims.

*Example 1*

The following were mixed at room temperature, 50 g. of $HS(CH_2CH_2OCH_2OCH_2CH_2S_2)_{\sim 6}$
$CH_2CH_2OCH_2OCH_2CH_2SH$ 45 g. of

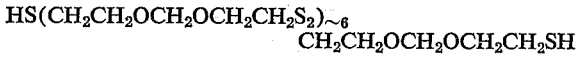

and 1 g. of a 25 percent solution of sodium methoxide in methanol. Within two hours the typical polysulfide odor was replaced by a fruity ester odor. The product was an amber, viscous liquid that remained stable indefinitely if kept in an air-tight container. The product was exposed to the air and the material turned very slowly into a solid. This reaction can be accelerated by adding specific catalysts for hydrolysis and condensation of methoxysilanes, such as stannous octoate.

*Example 2*

The following were mixed and warmed to 120° C.; 75 g. diallylitaconate, a trace of chloroplatinic acid, 0.1 g. phenyl beta-naphthylamine, and 0.1 g. hydroquinone. To this was added 120 g. $HSi(OCH_3)_3$. The mixture was refluxed for 3 hours at 110 to 120° C. and finally stripped to 130° C. at 3 mm. Hg pressure. 100 g. of an oily residue was recovered, known as bis-trimethoxysilylpropylitaconate:

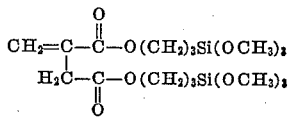

To 50 g. of this material was added 50 g. of

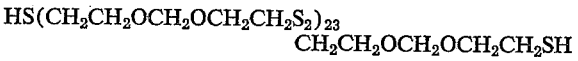

and 50 g. of toluene as a solvent. This was made alkaline with sodium methoxide in methanol and refluxed for one hour. The solution was then neutralized with $(CH_3)_3SiCl$, then filtered to give a clear amber liquid.

Thin films of this material were exposed to air for 24 hours. A sticky fluid resulted, indicating partial curing only. However, when a trace of $SnCl_4$ was added to the material before spreading it into a film, 24 hours of exposure to air caused it to cure to a flexible film.

*Example 3*

When the experiment of Example 2 is performed with the X groups as

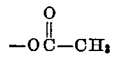

instead of $-OCH_3$, the product cures in humid air to a rubbery substance without the use of a catalyst.

*Example 4*

When the experiment of Example 2 is performed with the X groups as

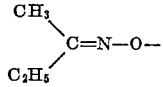

instead of $-OCH_3$, the product cures in humid air to a rubbery substance without the use of a catalyst.

*Example 5*

The following was warmed at 100° C. for four hours:

40 g. of $HS(CH_2CH_2OCH_2OCH_2CH_2SS)_{23}CH_2CH_2OCH_2OCH_2CH_2SH$

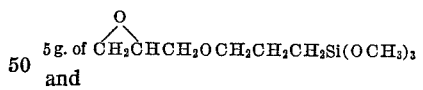

and

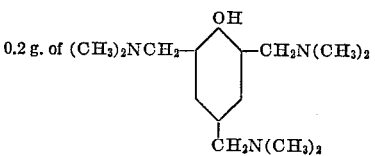

as a catalyst.

Reaction took place between the SH groups (and any incidental OH groups) on the polysulfide and the oxirane group on the silane to produce a compound of the average formula

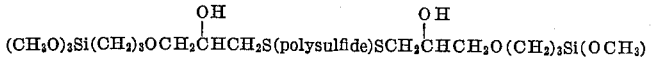

In these cases where the silane reacts with a OH on the polysulfide an O replaces the S in the above formula.

The product was a viscous, fluid polymer with very little thiol odor. A portion of the condensed product was mixed with 0.1 percent by weight of isopropyl titanate and exposed as a film to the atmosphere. Within 16 hours the film had set to a clear, flexible, non-tacky elastomer with excellent resilience.

Example 6

A mixture of the following was refluxed for 30 hours:

50 g. HS(CH$_2$CH$_2$OCH$_2$OCH$_2$CH$_2$SS)$_6$CH$_2$CH$_2$OCH$_2$OCH$_2$CH$_2$SH
25 g. CH$_2$=CH—Si(OCH$_3$)$_3$
50 g. toluene, and
0.1 g. benzoyl peroxide.

Additional benzoyl peroxide was added after 4 hours, 8 hours, and 24 hours.

The product was stripped to 200° C. at 30 mm. of pressure to remove the unreacted vinyltrimethoxysilane. The viscous fluid residue had a pleasant, fruity odor.

A portion of this residue was mixed with 0.1 percent by weight of isopropyl titanate and exposed to the atmosphere. In twelve hours a clear, flexible, non-tacky rubber formed.

Another sample was mixed with 0.1 percent by weight of isopropyl titanate and exposed to air at 100° C. It set to a clear, non-tacky rubber in one hour.

Example 7

When the following ingredients are reacted, compositions as shown are formed that cure in moist air, often without catalysts:

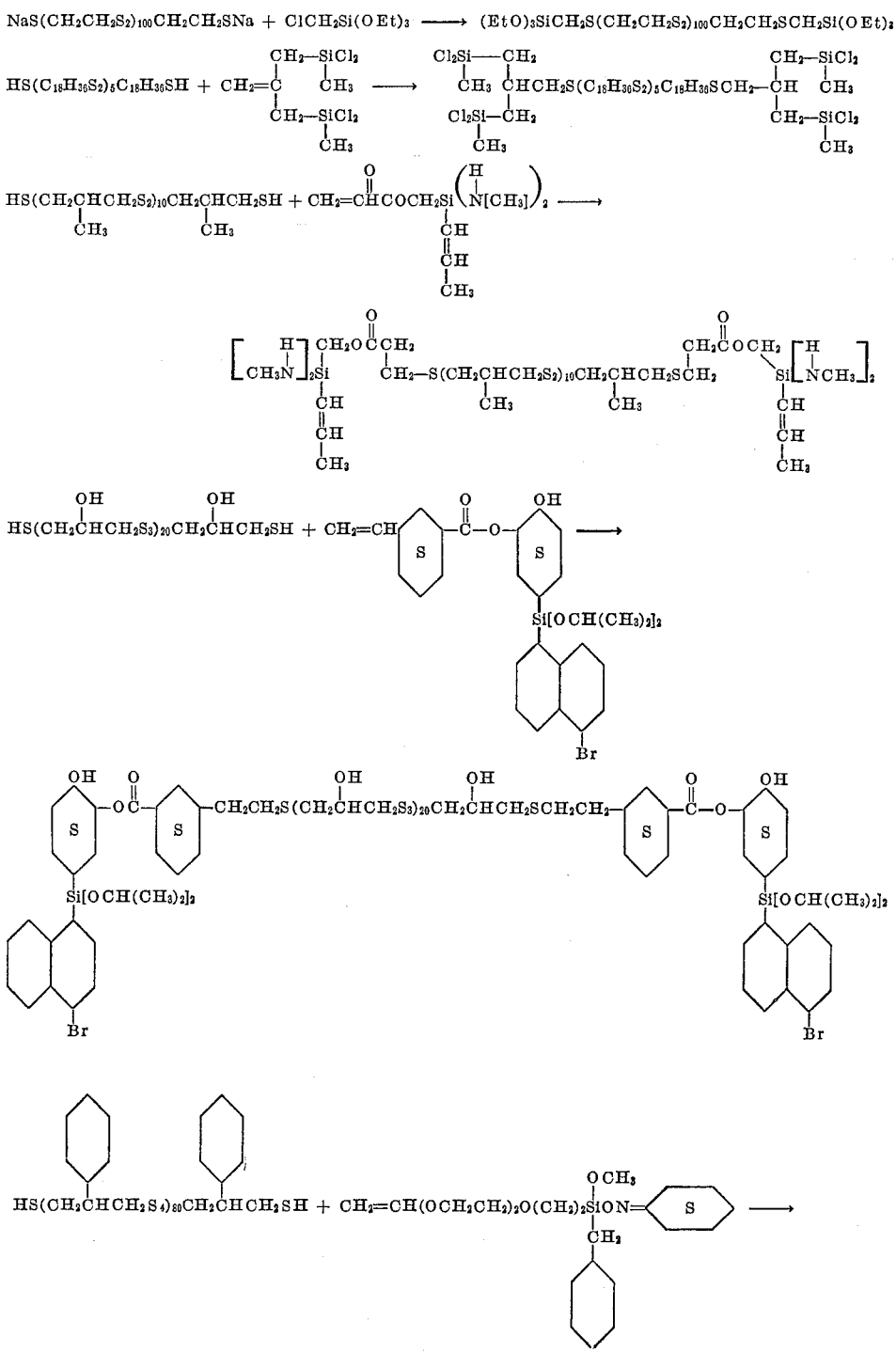

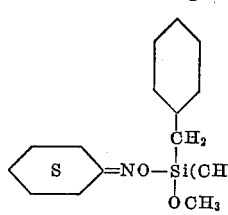

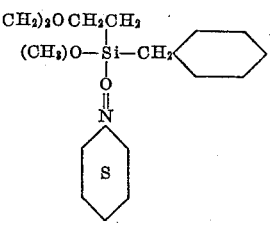
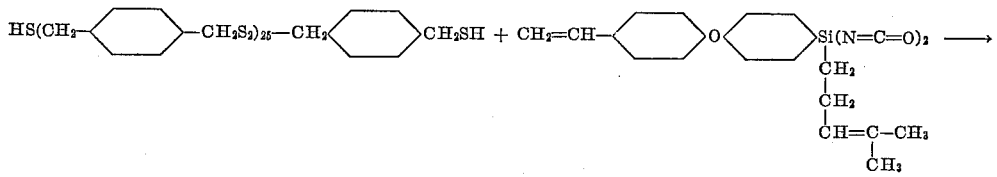
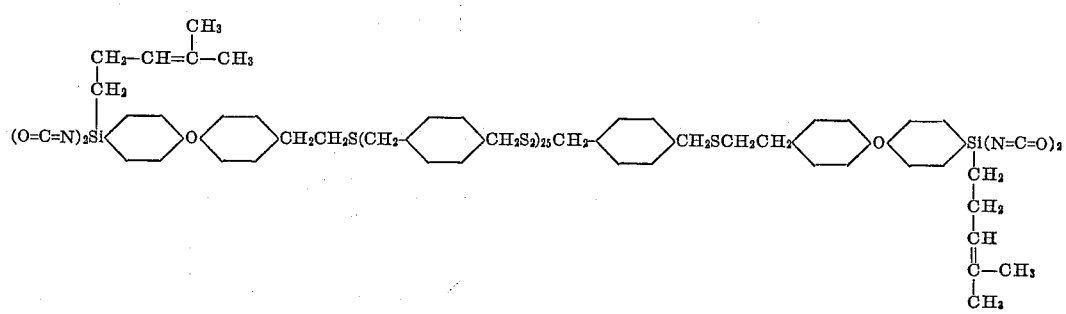
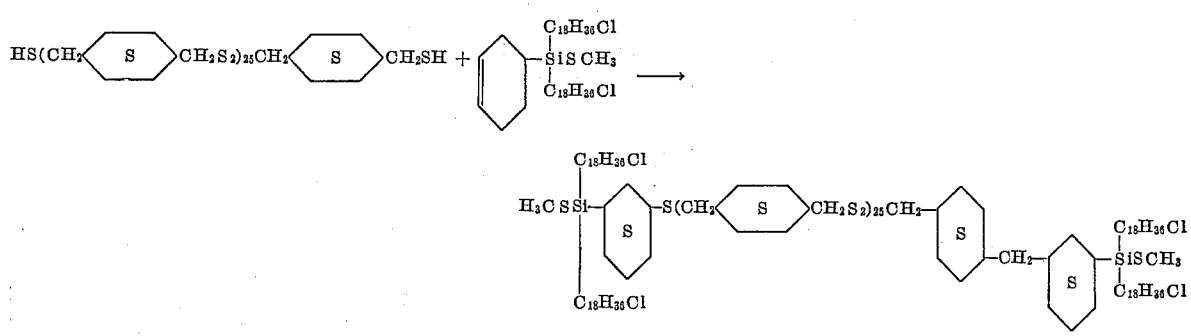
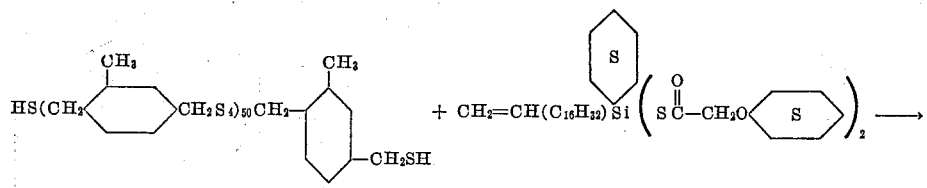
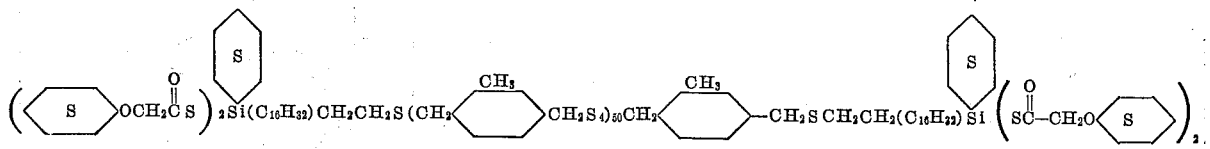
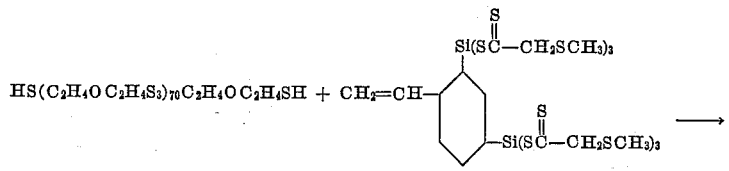

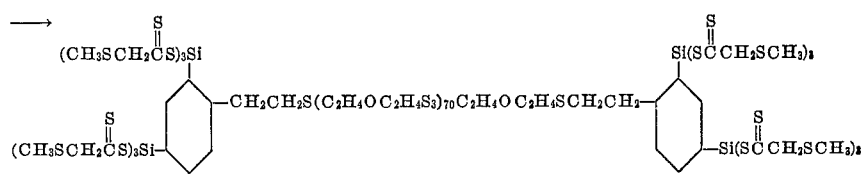
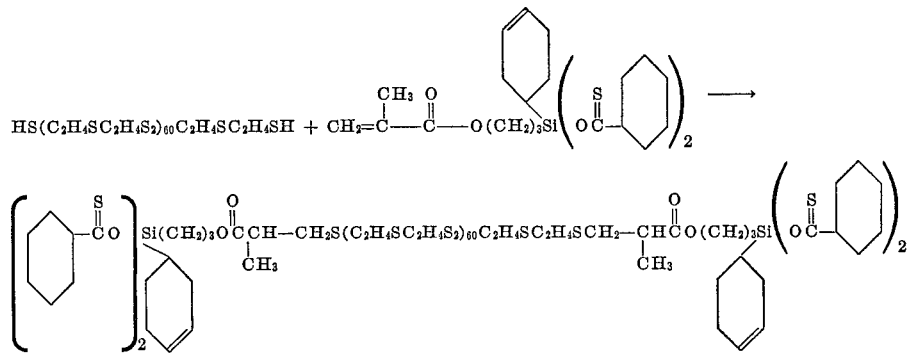
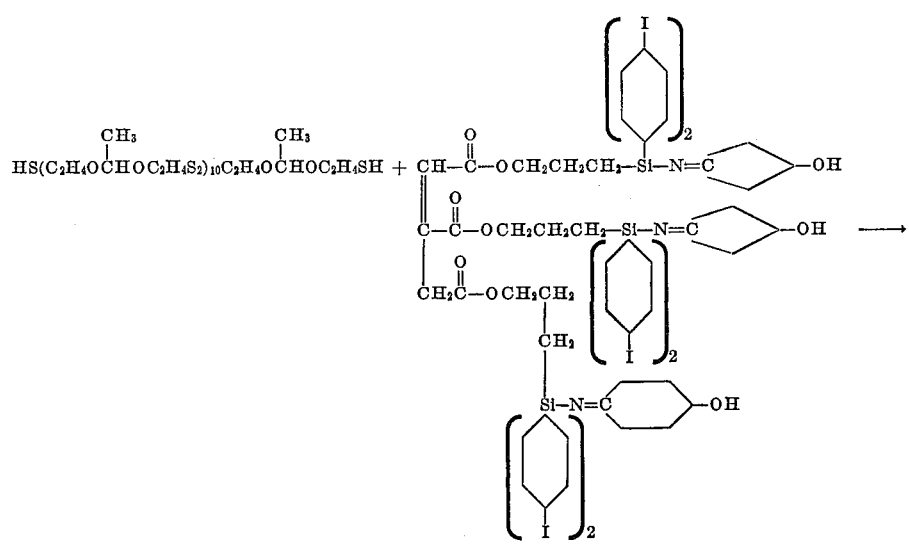
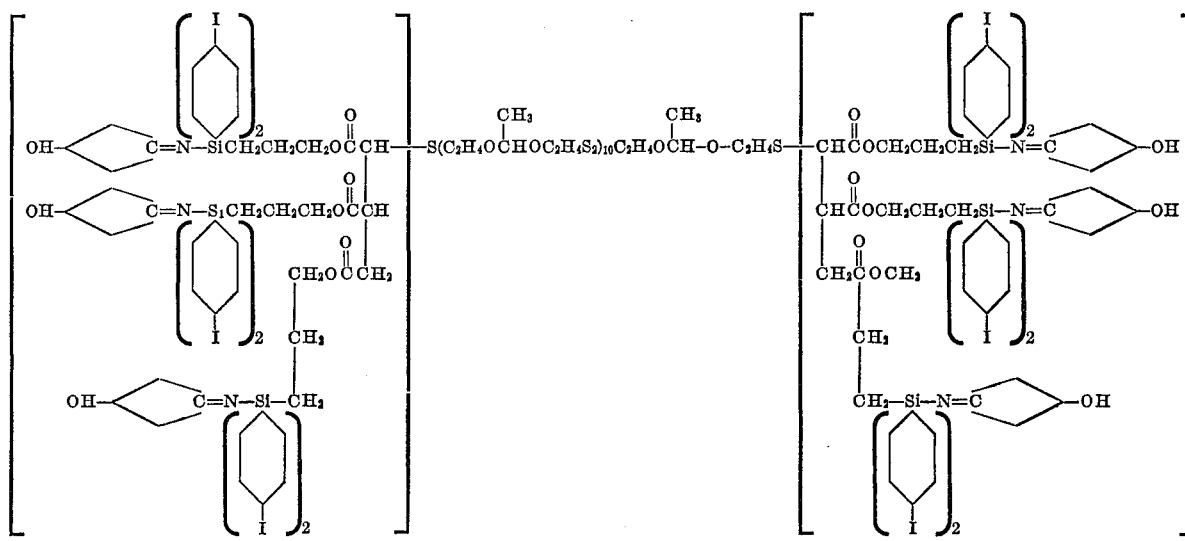
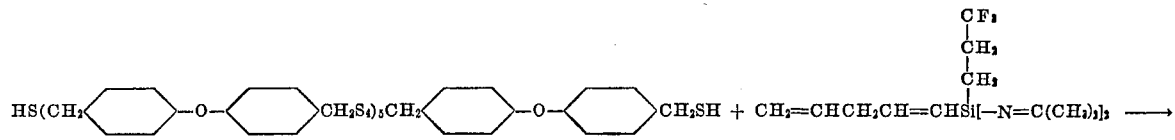

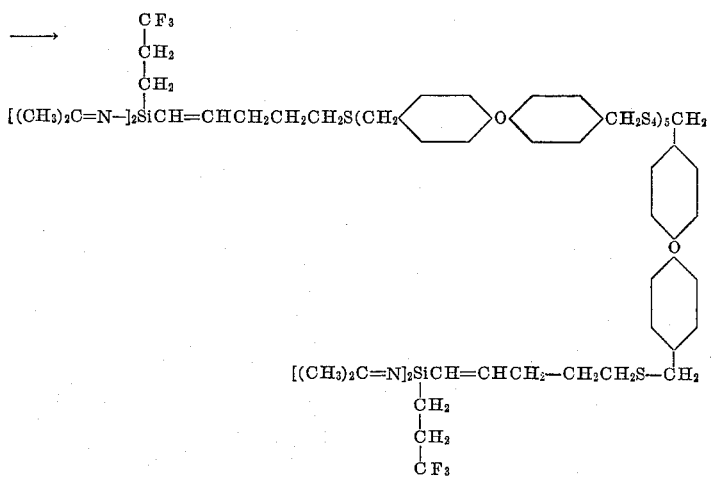

That which is claimed is:

1. A composition under anhydrous conditions which cures on exposure to moisture consisting essentially of a polymer of the formula

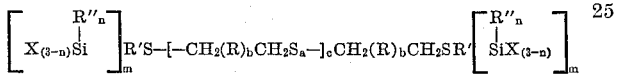

where $a$ is an integer of a value of 2 through 4, $b$ is an integer of a value of 0 through 1, R is a divalent radical, free of aliphatic unsaturation, comprising C and H in which divalent radical any remaining atoms are selected from the group consisting of O and S in the form of radicals of the group consisting of ≡C—O—C≡, —OH, —SH and ≡C—S—C≡, $c$ is an integer with a value of at least 1, R' is a multivalent radical having a valence of no more than 5, comprising carbon and hydrogen, any other atoms in the radical consisting of oxygen in the form selected from the group consisting of

≡C—O—C≡ and ≡C—OH, there being no acetylenic unsaturation in R', R'' is a monovalent radical selected from the group consisting of hydrocarbon and halohydrocarbon, $n$ is an integer of 0 through 2, X is a hydrolyzable group and $m$ is an integer equal to one less than the valence of R'; there being an average of at least 2 Si atoms and 3 X groups per molecule.

2. The composition in accordance with claim 1 where R is —CH₂OCH₂OCH₂—.

3. The composition in accordance with claim 1 where R' is the radical within the brackets below, being attached to the sulfur and silicon groups as indicated:

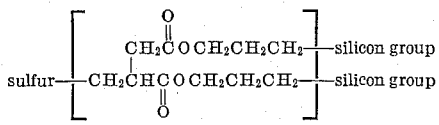

4. The composition in accordance with claim 1 where R' is selected from the group consisting of those radicals which are within the brackets below and which are attached to the sulfur and silicon groups as indicated:

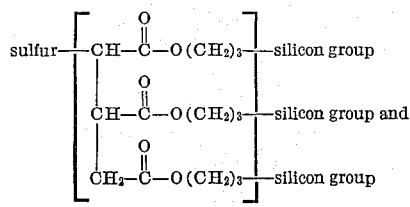

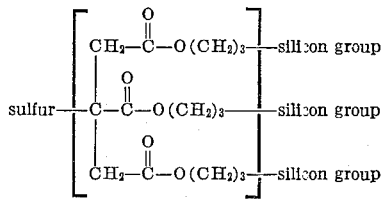

5. The composition in accordance with claim 1 where R' is the radical within the brackets below, being attached to the sulfur and silicon groups as indicated:

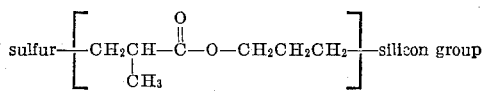

6. The composition in accordance with claim 1 where $c$ is in the range of 5 through 100.

7. The composition in accordance with claim 1 where X is acyloxy.

8. The composition in accordance with claim 1 where X is ketoxime.

9. The composition in accordance with claim 1 where X is alkoxy.

10. The composition in accordance with claim 1 where $n$ is 0.

11. The composition in accordance with claim 1 where $n$ is 1.

12. The composition of claim 1 mixed with a pigment.

References Cited by the Examiner

UNITED STATES PATENTS

| | | | |
|---|---|---|---|
| 2,216,044 | 9/1940 | Patrick | 260—79 |
| 2,878,195 | 3/1959 | Hurd | 260—46.5 |
| 2,960,492 | 11/1960 | Morton et al. | 260—79 |
| 3,021,292 | 2/1962 | Hurd et al. | 260—46.5 |
| 3,123,495 | 3/1964 | Carpenter et al. | 260—79 |
| 3,170,940 | 2/1965 | Johnston | 260—46.5 |
| 3,186,965 | 6/1965 | Plueddemann | 260—46.5 |

LEON J. BERCOVITZ, *Primary Examiner.*

M. I. MARQUIS, *Assistant Examiner.*